United States Patent [19]

Janes et al.

[11] 4,000,421

[45] Dec. 28, 1976

[54] WIRE ANODE FOR ISOTOPE SEPARATION APPARATUS

[75] Inventors: George Sargent Janes, Lincoln; John Philip Dotson, West Boxford, both of Mass.

[73] Assignee: Jersey Nuclear-Avco Isotopes, Inc., Bellevue, Wash.

[22] Filed: Sept. 30, 1974

[21] Appl. No.: 510,450

[52] U.S. Cl. .............................. 250/284; 55/147; 250/423 P

[51] Int. Cl.² .................. B01D 59/44; B03C 3/04; H01J 27/00

[58] Field of Search .......... 250/281, 282, 283, 284, 250/296, 324, 325, 326, 423 P; 55/147

[56] References Cited

UNITED STATES PATENTS 3,425,190   2/1969   Ragland .............................. 55/147

Primary Examiner—Alfred E. Smith
Assistant Examiner—T. N. Grigsby
Attorney, Agent, or Firm—Weingarten, Maxham & Schurgin

[57] ABSTRACT

In uranium enrichment, an electrode structure of thin, tensioned, parallel wires for use in applying an electric field to a region of a flowing uranium plasma including selectively ionized particles in order to accelerate the ionized particles for separate collection without interfering with the motion of neutral particles.

24 Claims, 3 Drawing Figures

U.S. Patent     Dec. 28, 1976     4,000,421
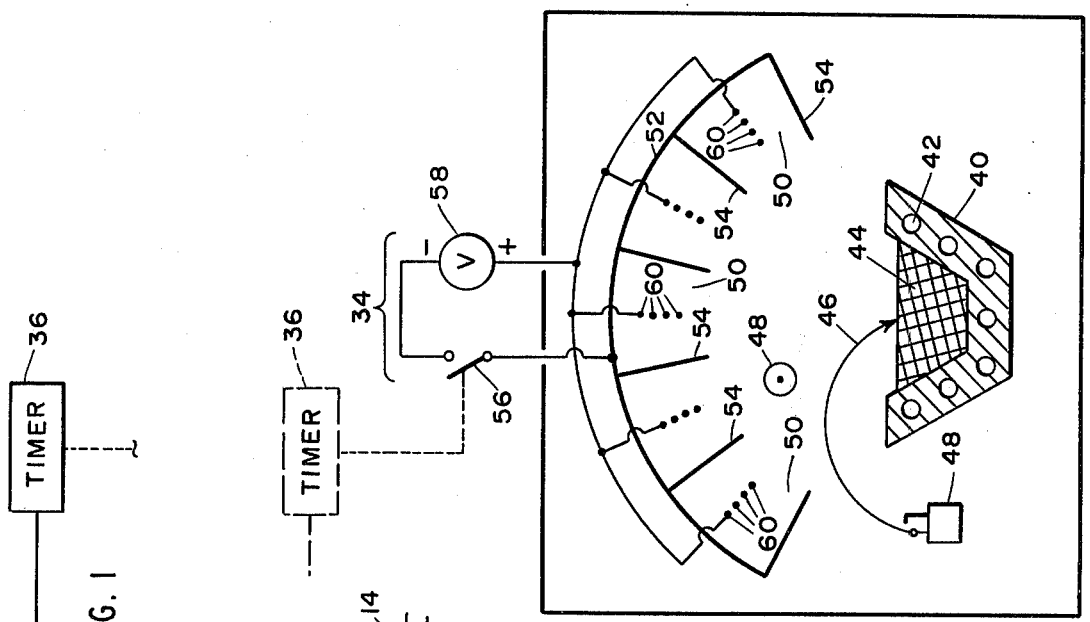
FIG. 1
FIG. 2
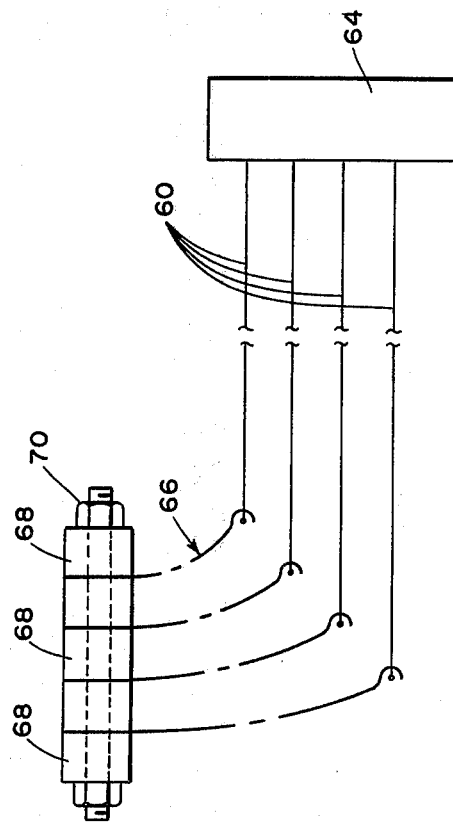
FIG. 3

WIRE ANODE FOR ISOTOPE SEPARATION APPARATUS

FIELD OF THE INVENTION

The present invention relates to electrodes in a plasma and in particular to such electrodes for use isotope separation.

BACKGROUND OF THE INVENTION

In laser enrichment of uranium according, for example, to the technique of U.S. Pat. No. 3,772,519, or U.S. Pat. application Ser. No. 328,954, filed Feb. 2, 1973, a beam of laser radiation is applied throughout an elongate chamber to produce isotopically selective ionization of a flowing uranium vapor. The ions thus created have a substantially greater concentration of a desired isotope than occurs in the vapor generally.

These ions which represent an enrichment in the desired uranium isotope are subsequently accelerated onto separate collection plates by crossed-field magnetohydrodynamic forces. This crossed-field results from the simultaneous application of magnetic and electric fields.

BRIEF SUMMARY OF THE INVENTION

In accordance with the teaching of the present invention an electrode structure of thin, tensioned wires is disclosed for applying the electric field component of a crossed-field magnetohydrodynamic accelerator to a plasma of uranium ions.

The plasma comprises a plurality of charged and neutral uranium vapor particles with a predetermined flow direction and velocity. The ions, typically enriched in the U-235 isotope, are created by isotopically selective laser excitation and subsequent ionization of particles in the uranium vapor flow. The electrode is located to apply an electric field to the ions and to act with a magnetic field also applied to the vapor flow to accelerate them toward collection plates where they are deposited apart from other components of the vapor flow.

The multiple thin wires of the electrode are separately tensioned to maintain a generally straight line characteristic for the electrode structure over a substantial length corresponding to the elongate dimension of the chamber. The thinness of the wires prevents interception and collection of substantial neutral vapor flow components and reduces the particle shadow behind the electrode which could affect the crossed-field magnetohydrodynamic acceleration efficiency.

BRIEF DESCRIPTION OF THE DRAWINGS

These and other features of the invention are more fully set forth below in a detailed description of the preferred embodiment, presented for purposes of illustration and not by way of limitation, and in the accompanying drawings of which:

FIG. 1 is a system diagram of enrichment apparatus embodying the invention;

FIG. 2 is a sectional view of a portion of the FIG. 1 apparatus; and

FIG. 3 is a pictorial view of opposite end portions of the electrode structure shown in FIGS. 1 and 2.

DETAILED DESCRIPTION OF THE PREFERRED EMBODIMENT

The present invention contemplates a wire electrode (anode) structure for use in a plasma region of multiple particle flow as part of an isotope separation system. The system is typically employed for uranium enrichment using vaporized uranium atoms as the particle flow, but may be applied to separation of molecular or atomic particles in general. The basic elements of a uranium enrichment system for which the present anode structure may be employed is illustrated in U.S. Pat. No. 3,772,519 or U.S. Pat. applications, Ser. No. 328,954, filed Feb. 2, 1973 and Ser. No. 469,407, filed May 13, 1974, all incorporated herein by reference.

Such a system for uranium enrichment may typically include a laser system 12. The laser system 12 provides an output beam 14 of laser radiation to a chamber 16. The radiation in beam 14 may, as described in the above-referenced U.S. patent and applications, comprise a plurality of frequencies of laser radiation generated by one or more tunable dye lasers which in the case of three excitation frequencies may typically be in the red-orange portion of the visible spectrum to reach the vicinity of the 6.2ev ionization potential for uranium. For the final ionization step, the laser frequency may be in the infra-red region such as is produced by a $CO_2$ laser or ionization may be achieved by electron impact ionization or by other means.

The chamber 16 receives the radiation in beam 14 through a window 18 on an extended pipe 20. The beam 14 passes through an ion separator 22 and, by reflective means, may be caused to make a plurality of traversals to illuminate separate, adjacent chambers in the separator 22 as is shown in FIG. 2. The beam 14, after traversing the ion separator 22, exits the chamber 16 through a further pipe 24 and window 26.

The chamber 16 has below the ion separator 22 a uranium evaporator 28. The chamber 16 is typically maintained at a low pressure by a vacuum system such that the region of uranium vapor in the ion separator 22 may be kept at a pressure of approximately $10^{-5}$ torr.

The chamber 16 has surrounding it a set of magnetic field induction coils 30 which produce an axial magnetic field within the chamber 16 substantially parallel to the laser beam 14. Current for the coils 30 is provided from a current source 32.

A voltage source 34 is controlled by a timer 36 which in turn triggers the laser systems 12 and applies its potential to separator 22 for a repetitive sequence of laser radiation and ion separation. The timer 36 typically activates the laser systems 12 for a laser pulse duration typically in the range of a few nanoseconds up to a substantial fraction of a microsecond and directly subsequent to the laser radiation in beam 14 activates the voltage source 34 for application of an electrical potential within the ion separator 22 for a duration of up to several microseconds. The electrical potential from voltage source 34 is applied between the plates of the ion separator 22 and an anode structure 38 which run between the plates of the ion separator 22.

The details of the ion separator 22 and anode structure 38 are more fully illustrated with respect to FIGS. 2 and 3. As shown in FIG. 2, the chamber 16 includes as the vapor source 28 a crucible 40 having a plurality of cooling ports 42 and containing a mass 44 of uranium metal which is evaporated by the energy in an electron beam 46 from a filamentary electron beam source 48. Electron beam 46 is focused to a line upon the surface of the uranium mass 44 by a magnetic field 48 created within the chamber 16 by the coils 30. Typically, the field 48 is within the range of 100–300 gauss.

Within the chamber 16, the ion separator 22 is shown to include a plurality of chambers 50 defined by a rear, cylindrical-section plate 52 for which the line source of vapor from the uranium mass 44 is an approximate center of rotation. The chambers 50 are further defined by a plurality of plates 54 which extend from the metallic cylindrical section plate 52 radially inward toward the line source from uranium mass 44. The plates 54 and 52 are electrically conductive and connected through a conductor to a switch 56 which is controlled by the timer 36. A voltage source 58, of 60 volts as an exemplary potential within the range of approximately 10–100 volts is connected in series with the switch 56 to a plurality of anode wires 60 generally centrally located within the chambers 50 and forming the anode structure 38. In preferred embodiment, the voltage source 58 applies a positive potential to the anode wires 60 with respect to the plates 52 and 54. The pulsed application of an electric field between the anode wires 60 and plates 54 and 52 induces an acceleration on the particles ionized within the chambers 50 by laser radiation passing through them by the multiple reflections of the beam 14. The acceleration as fully described in the above-referenced United States patent application Ser. No. 328,954, filed Feb. 2, 1973, forces the ions onto the side of the plates 54 in each chamber 50 for collection.

As seen in FIG. 3, the anode wires 60 consist of a plurality of stretched filaments which are anchored at one end of the chamber 16 to a plate 64 attached to an end of the chamber. The plate 64 includes insulation material to electrically isolate the wires 60 from the typically stainless steel material forming the sidewalls of the chamber 16. The wires 60, which typically are made of tungsten and are of 1 millimeter in diameter are stretched across the axial length of the chamber 16 by corresponding spring arms 66 which tension the wires 60 with a force of approximately 5 kg. The wires are approximately one meter in length for the typical chamber 16 and are separated by 0.5 cm from each other. The respective spring arms 66 are secured between segmented blocks 68 which are forced together by nut and bolt compression means 70. The spring arms 66 may typically be electrically connected, either through the bolt compression means 70 and blocks 68 or other means for conduction to the source 58 at the positive terminal thereof. The assembly of blocks 68 and bolt compression means 70 are insulatingly supported from the walls of the chamber 16 in any desired fashion.

In the design of this electrode configuration, tungsten wire has been selected as providing a substantial degree of tensile strength at the elevated temperatures encountered in a system wherein elemental uranium is evaporated by electron beam techniques. Additionally, the wires 60 when fabricated of tungsten may be readily cleaned of uranium by placing them in a nitric acid bath.

The springs 66 may similarly be fabricated of a tungsten band, and the use of individual springs 66 permits each wire 62 and spring 66 pair to independently experience thermal expansion and compression without interaction with other wire-spring pairs, leading to a possible sagging. The typical spring arm 66 is a flat tungsten band of approximately 3 millimeters thickness, 13 millimeters width and from 12 to 14 centimeters in length. The spring arms 66 further provide ease of alignment of wires 60 through adjustment of the position and location of the arms 66 between blocks 68 so that wires 60 may be in a single plane. Alternatively, a counterweight system may be utilized to provide tensioning of the wires 60.

The operation of the ion separator 22 involves a magnetohydrodynamic acceleration upon charged particles within the chambers 50. The particles upon which this effect is produced comprised both ions and electrons. The ions are in general created by isotopically selective ionization in accordance with the techniques of laser enrichment described in the above-reference U.S. patent and applications. Electrons, and some ions, are also created by Saha emissions of ion-electron pairs from the uranium mass 44. The efficient generation of magnetohydrodynamic accelerations, particularly on the ions created with isotopic selectivity, involves the motions of both ions and electrons within the chambers 50 with gyro radii of substantially differing dimensions. In addition, neutral particles within the uranium vapor flow continue on a path through the chambers 50 without acceleration for collection on the rear plate 52.

For efficient utilization in laser enrichment, magnetohydrodynamic separation of the selectively created ions requires that the unaccelerated flow of neutral particles and the motion of the charged particles under the magnetohydrodynamic forces be as free of interfering barriers as possible within each chamber 50. It has accordingly been determined that a central electrode within each chamber 50 comprising a plurality of thin wires 60, aligned one behind the other as described with respect to FIGS. 2 and 3, provides a uniquely efficient manner for generating the electric field within the chambers 50 that cooperates with the magnetic field 48 for production of separative forces on the ionized particles. As a part of the generation of these magnetohydrodynamic forces, a circulation of electrons is induced around the electrode structure 60. Such a circulation becomes more efficient when a structure of the type illustrated in FIGS. 2 and 3 is employed since there is generally no substantial shadow of electrons cast by it. Additionally, the low profile of the filamentary electrode wire 60 reduces the amount of uranium in the vapor flow intercepted by the electrode structure.

The figures given above are only exemplary and are not intended as a limitation against the use of other configurations since it will occur to those skilled in the art that alternatives and modifications to the disclosed structure may be employed within the scope of the present invention. It is accordingly intended to define the present invention only in accordance with the following claims.

What is claimed is:

1. Apparatus for applying an electric field acceleration to ions in an environment of flowing charged and neutral particles comprising:

at least one chamber forming a partial enclosure for a region of said environment and having within said chamber the flowing environment of said charged and neutral particles;

said chamber being elongate in a direction generally across the direction of flow of said flowing particles;

an electrode structure within said chamber and extending through said chamber substantially the elongate dimension of said chamber;

said electrode structure being generally flexible over its length;

the electrode structure having a large dimension in the direction of the flow of said flowing particles and a proportionally much smaller dimension transverse to said flow and further being apertured therethrough in a direction substantially orthogonal to both the elongate dimension of said chamber and the direction of said flow;

means for fixedly positioning the electrode structure at both ends of its length; and means for tensioning said electrode structure to provide a straight characteristic thereto in said chamber over its length.

2. The apparatus of claim 1 wherein said electrode structure includes a plurality of stretched wires.

3. The apparatus of claim 2 wherein said plurality of stretched wires are positioned generally adjacent and parallel to each other and displaced from each other in the direction of the particle flow.

4. The apparatus of claim 3 wherein said wires comprise tungsten.

5. The apparatus of claim 2 wherein said wires extend at least approximately a meter in the elongated direction of said chamber.

6. The apparatus of claim 2 further including means for independently tensioning each of said wires.

7. The apparatus of claim 6 wherein the tension of each of said wires is approximately 5 kg.

8. The apparatus of claim 2 wherein said wires are spaced parallel and separated by no greater than approximately 0.5 centimeters from each other.

9. The apparatus of claim 1 further including means for providing pulses of electric potential between said electrode structure and said chamber.

10. Apparatus for applying an electric field acceleration to ions in an environment of flowing charged and neutral particles comprising:

a plurality of chambers forming a partial enclosure for regions of said environment and including an arcuate plate generally transverse to the direction of flowing charged and neutral particles and a plurality of chamber defining side plates connected to said arcuate plate and generally in the plane of flow of said particles;

the chambers defined by said plates being elongate in a direction generally transversed to the direction of said particle flow and lying in the plane of said plates;

a plurality of electrode wires extending centrally through each of said chambers in the elongate direction thereof;

said plurality of wires in each chamber being generally parallel to each other and displaced from each other in a plane substantially parallel to the flow of charged particles;

a means for securing each of said plurality of wires in each of said chambers at one end thereof;

a spring arm tensioning the other end of each of said plurality of wires in each of said chambers and providing independent tensioning of each of said wires and permitting independent alignment thereof in the plane substantially parallel to the direction of flow of said particles;

a source of electric potential for application of an electric field between said plurality of wires and said plates;

means for applying the electric field potential between said wires and said plates in pulses.

11. The apparatus of claim 10 further including means for applying pulsed laser radiation in timed sequence with the applied pulses of electric potential in the region of said wires between said plates.

12. The apparatus of claim 11 wherein said environment includes as said particles, plural isotopes of elemental uranium atoms.

13. Apparatus for applying an electric field acceleration to ions in an environment including flowing charged and neutral uranium particles comprising:

at least one chamber forming a partial enclosure for a region of said environment and having within said chamber the flowing environment of said charged and neutral uranium particles;

said chamber being elongated in a direction generally across the direction of flow of said flowing uranium particles;

an electrode structure within said chamber and extending through said chamber substantially the elongate dimension of said chamber;

said electrode structure being generally flexible over its length;

the electrode structure having a large dimension in the direction of the flow of said flowing uranium particles and a proportionally much smaller dimension transverse to said flow and further being apertured therethrough in a direction substantially orthogonal to both the elongate dimension of said chamber and the direction of said flow; and means for tensioning said electrical structure to provide a straight characteristic thereto in said chamber over its length.

14. The apparatus of claim 13 wherein the charged particles include an isotope of uranium in a greater concentration than the concentration of the particles of that isotope type among the neutral particles.

15. The apparatus of claim 14 further including means for applying electromagnetic radiation in the region of said chamber surrounding said electrode structure to produce isotopically selective excitation of uranium particles of one isotope type.

16. The apparatus of claim 15 wherein said electromagnetic radiation includes laser radiation.

17. The apparatus of claim 16 wherein the radiation applying means produces ionization of excited uranium particles.

18. The apparatus of claim 16 wherein the excited particles are ionized by electron impact.

19. Apparatus for applying an electric field acceleration to ions in an environment of flowing charged and neutral particles comprising:

at least one chamber forming a partial enclosure for a region of said environment and having within said chamber the flowing environment of said charged and neutral particles said chamber being elongate in a direction generally across the direction of flow of said flowing particles;

an electrode structure within said chamber and extending through said chamber substantially the elongate dimension of said chamber;

said electrode structure being generally flexible over its length and comprising a plurality of wires;

the electrode structure having a large dimension in the direction of the flow of said flowing particles and a proportionately much smaller dimension transverse to said flow and further being apertured therethrough in a direction substantially orthogonal to both the elongate dimension of said chamber and the direction of said flow; and spring arms independently tensioning each of the wires of said electrode structure to provide a straight characteristic thereto in said chamber over its length.

20. The apparatus of claim 19 wherein said wires are aligned adjacent to the others in a single plane.

21. The apparatus of claim 20 further including means for supporting said spring arms to provide separate alignment of said wires.

22. Apparatus for applying an electric field acceleration to ions in an environment of flowing charged and neutral particles comprising:

at least one chamber forming a partial enclosure for a region of said environment and having within said chamber the flowing environment of said charged and neutral particles;

said chamber being elongate in a direction generally across the direction of flow of said flowing particles;

an electrode structure within said chamber and extending through said chamber substantially the elongate dimension of said chamber;

said electrode structure being generally flexible over its length;

the electrode structure having a large dimension in the direction of the flow of said flowing particles and a proportionately much smaller dimension transverse to said flow and further being apertured therethrough in a direction substantially orthogonal to both the elongate dimension of said chamber and the direction of said flow;

means for tensioning said electrode structure to provide a straight characteristic thereto in said chamber over its length; and means for applying a magnetic field in the region of said electrode structure.

23. The apparatus of claim 22 wherein the magnetic field in the region of said electrode structure is substantially parallel to the elongate dimension of said chamber.

24. Apparatus for applying an electric field acceleration to ions in an environment of flowing charged and neutral particles including electrons, comprising:

at least one chamber forming a partial enclosure for a region of said environment and having within said chamber the flowing environment of said charged and neutral particles;

said chamber being elongate in a direction generally across the direction of flow of said flowing particles;

an electrode structure within said chamber and extending through said chamber substantially the elongate dimension of said chamber;

said electrode being generally flexible over its length;

the electrode structure having a large dimension in the direction of the flow of said flowing particles and a proportionally much smaller dimension transverse to said flow and further being apertured therethrough in a direction substantially orthogonal to both the elongate dimension of said chamber and the direction of said flow;

said electrode structure centrally located within the chamber;

means for tensioning said electrode structure to provide a straight characteristic thereto in said chamber over its length; and means for circulating electrons around said electrode structure on generally closed paths.

* * * * *